May 6, 1969 C. GATTO 3,442,168

CUTTING MEANS FOR CONTINUOUSLY FED MATERIALS

Filed July 19, 1966 Sheet 1 of 3

INVENTOR
Charles Gatto

BY Clive H. Bramson
ATTORNEY

INVENTOR
Charles Gatto

BY Clive H. Bramson
ATTORNEY

INVENTOR
Charles Gatto
BY Clive H. Bramson
ATTORNEY

United States Patent Office 3,442,168
Patented May 6, 1969

3,442,168
CUTTING MEANS FOR CONTINUOUSLY FED MATERIALS

Charles Gatto, 134 Rome St., Farmingdale, N.Y. 11735

Filed July 19, 1966, Ser. No. 569,550
Int. Cl. B26d 5/20, 7/06
U.S. Cl. 83—354 14 Claims

ABSTRACT OF THE DISCLOSURE

A device for separating an elongated material into sections of predetermined lengths having a cutting knife that is moved into and out of cutting position by an operating structure.

This invention relates to cutting devices and more particularly to a device for slicing extruded or other continuously fed materials into sections of perdetermined and uniform lengths. More specifically, the invention is essentialy directed to novel drive means for moving a cutting knife into operative position and futher to improve means for actuating said drive means.

The device according to the present invention is preferably adapted to the cutting of extruded plastics such as tubing or the like and may be arranged to receive such extrusions directly from the extruder and its cooling instrumentality where cooling is required and to cut the extruded product into predetermined lengths as the product is continuously fed past the cutting knife of the device. The device further includes means for feeding the material past the cutting station at a uniform rate of speed. Thus, by maintaining uniformity with respect to the rate at which the primary movable member or flywheel rotates, the only consequential variable to be controlled is the frequency at which the cutting knife is moved into operative position.

Accordingly, and in consonance with the foregoing, the primary object of the present invention resides in the provision of improved pneumatic drive means capable of effectuating pivotal movement of the cutting knife, such movement being between operative and inoperative positions.

Another object of the instant invention is to provide a device of the foregoing character wherein the cutting rate thereof may be pre-selected and photoelectrically regulated.

A further object of this invention resides in the provision of extrusion cuting apparatus wherein the movable cutting knife is pivotally and ball-bearingly mounted upon a primary movable member thereby minimizing wear otherwise heretofore occasioned where the cutting blade is slidably mounted for extension and retraction with respect to the primary movable member.

Another object of the present invention is to provide a device in accordance with the foregoing wherein simplicity has been achieved by dint of the pneumatic embodiment herein utilized for actuating the cutting knife.

Still another object of the instant invention is to provide a cutting device including a pneumatic activating system, said system being selectively regulated to effectuate predetermined movement of a cutting knife into operative cutting position.

A further object of the invention is to provide cutting means including a gear and rack system of converting linear motion to rotary motion to thereby effectuate faster extension and retraction of the cutting knife.

A still further object of the invention resides in the provision of a device as above characterized wherein a double acting air cylinder is utilized to thus aflord positive locking of the cutting knife in either the extended or the retracted position.

Other objects and advantages of the instant cutting means for continuously fed material will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate the invention, and together with the description, serve to explain the principles of the invention.

Figure 1:
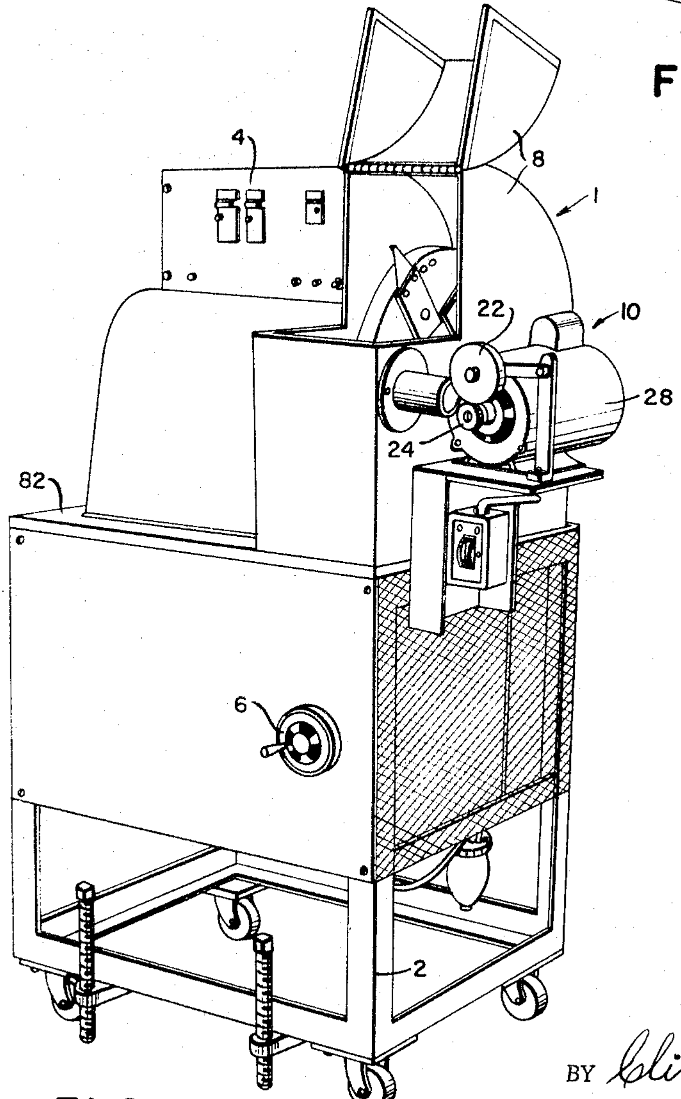
FIGURE 1 is a perspective view of a machine assembly comprising the instant cutting means.

With reference now in detail to the accompanying drawings wherein the present preferred and modified embodiments of the invention are illustrated, it will be understood that the drawings and the conjunctive detailed description hereinbelow following, while exemplary and explanatory, are not restrictive of the invention. FIGURE 1 shows the cutting device designated generally by numeral 1 as assembled into an entire unit including support stand, electronic control system 4, cutting-rate selector 6, cutting knife and flywheel shield 8, and extrusion material feeding means designated generally by numeral 10.

Figure 2:
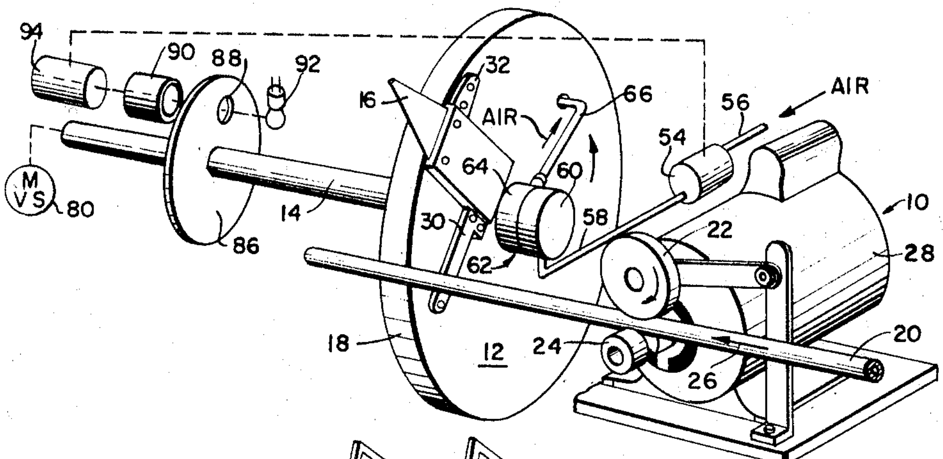
FIGURE 2 is an enlarged fragmentary perspective view of the cutting and feeding means and associated electronic control components schematically illustrated.

In FIGURE 2 of the drawings wherein the essential elements of the device and the relative coaction therebetween are observable, flywheel 12, more broadly referred to herein as the primary movable member, will be seen to be axially mounted for cyclical rotation on drive shaft 14. Cutting knife 16, shown in operative cutting position, extends beyond periphery 18 of said flywheel and is thus in cutting relation with respect to extruded plastic tubing 20 which is being drawn between feed rollers 22 and 24 in the direction of arrow 26, the latter roller being driven by electric motor 28.

Figure 4:
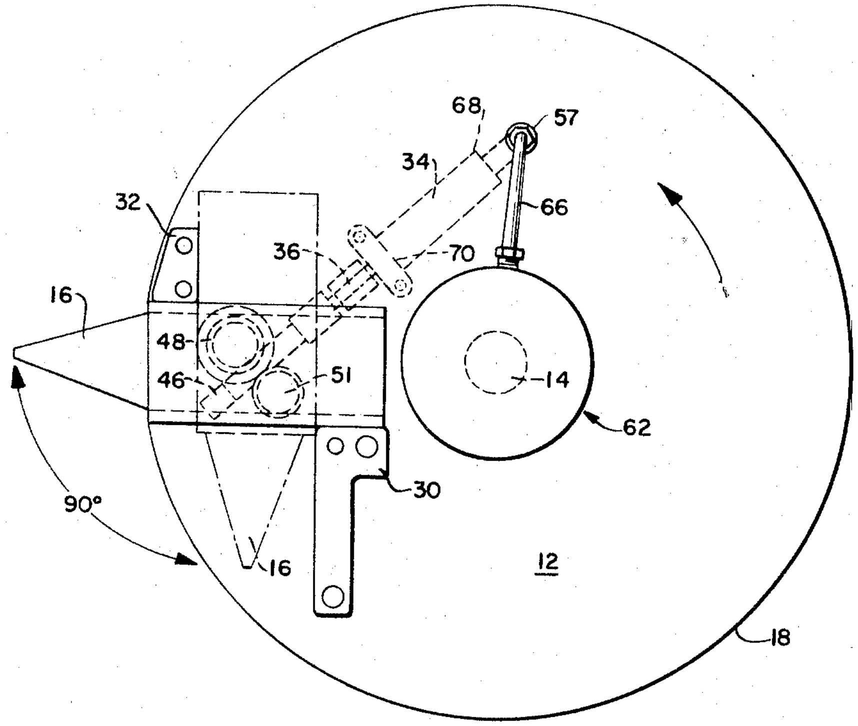
FIGURE 4 is an elevational view of the primary movable member facing the side thereof upon which the cutting knife is mounted.

As shown in FIGURE 4, cutting knife 16 is angularly movable between an operative position extending beyond the periphery 18 of flywheel 12 and an inoperative position wherein said knife lies without said periphery, the latter position being designated in broken line configuration. Inner and outer stop blocks 30 and 32, respectively, cooperate to assure accurate location of said cutting knife in either of the aforedescribed positions subsequent to the activation of said cutting knife by air cylinder 34 in the manner to be hereinbelow described. It will be observed by reference particularly to FIGURES 4 and 6 of the drawings that said cutting knife 16, when in the operative position, is disposed radially with respect to said flywheel 12, the blade portion thereof being extended beyond periphery 18 of said flywheel as aforementioned, and when in the inoperative position, lies within the periphery substantially in the manner of a chord of a circle. The angular movement of said cutting knife as governed by said inner and outer stop blocks 30 and 32 is approximately 90° although restriction to such movement is not intended to be limiting but exemplary and preferential within the purview of this disclosure.

Figure 3:
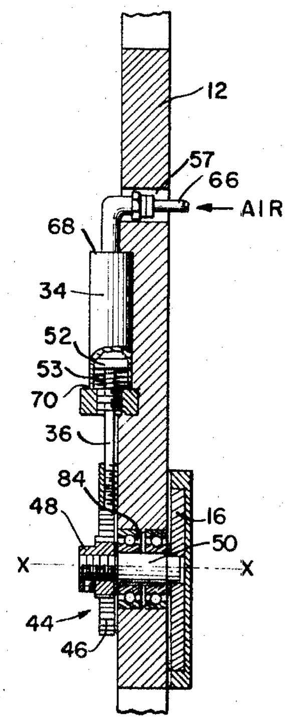
FIGURE 3 is a side evelational partial cross-sectional view of the primary movable member, cutting knife and associated knife-moving elements.

As illustrated in FIGURE 3, air cylinder 34 and the rack and pinion gear assembly are located on one side of flywheel 12, air pressure source 66 being arranged to pass through passage 57 through said fly wheel and into said air cylinder. It will be further observed that said air cylinder is mounted in a partially recessed manner with respect to said flywheel to minimize resistance to rotation and to enhance the structural strength of the assembly.

Figure 5:
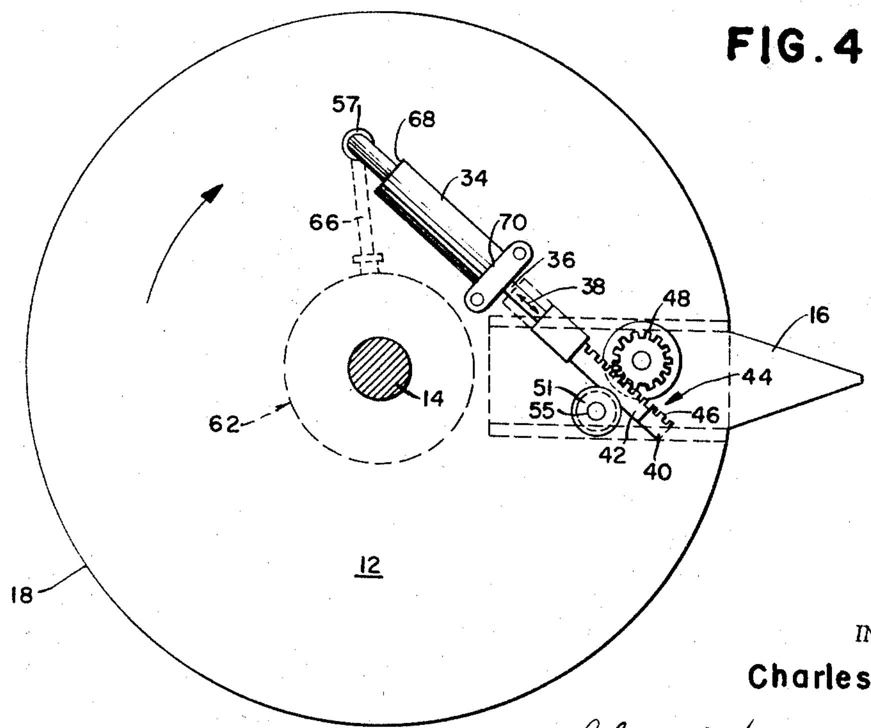
FIGURE 5 is an elevational view of the primary movable member facing the side thereof upon which the pneumatic cylinder is mounted.

Pneumatic air cylinder 34 includes piston rod 36 shown directly, e.g., in FIGURE 5 of the drawings, said piston rod being movable, as indicated by double arrow 38, between extended and retracted positions designated repectively by numerals 40 and 42. As will be observed, piston rod 36 has a free end designated generally by numeral 44 and a gear rack 46 extending inwardly of said free end as shown, said gear rack being in meshing engagement with pinion or spur gear 48, and the latter being connected to said cutting knife 16 via shaft or knife-carriage 50 as illustrated in FIGURE 3. Retaining wheel 51 is, as shown, rotatably connected to said flywheel at bushing 55 and is disposed spacedly with respect to said pinion gear whereby said gear rack is movably received and retained between said pinion gear and said retaining wheel.

A conventional variable speed electric motor 80 mounted upon deck 82 of the assembled device illustrated in FIGURE 1, is drivingly connected to shaft 14 as schematically shown in said figure, to rotate said flywheel 12 within a selectable range of preferably 100–1000 rotations per minute. To accomplish one cutting operation, for example, during every other revolution, the cutting knife must be extended and retracted with extreme swiftness and the pivotal mounting arrangement of said knife and the pneumatic means capable of extending same affords exceptional effectuation of such swiftness. To further facilitate the aforedescribed action, shaft 50, the connecting carriage between knife 16 and pinion gear 48, is rotatably supported by ball bearing assembly 84 provided through flywheel 12. Accordingly, friction is rendered minimal and the character of the blade movement is optimum.

It will be further noted that the center of rotation of pinion gear 48 is coaxial with respect to the pivotal axis of said cutting knife, said center and axis being commonly indicated as X—X of FIGURE 3. Accordingly, rotation of pinion gear 48 by linear movement of rack gear 46 will cause concurrent pivotal movement of cutting knife 16. Specifically, when piston rod 36 is moved to the extended position 40, gear 48 will be caused to rotate counterclockwise as appearing in FIGURE 5 and knife 16 will be moved into its operative or extended position as seen in FIGURE 5. Compression spring 53 acts against piston rod 36 within air cylinder 34 to maintain said piston rods in the normally retracted position, the force of said spring being overcome by pneumatic pressure upon piston 52 in response to the controlled flow of air through solenoid air valve 54 shown in FIGURE 2 of the drawings. Thus, when air from supply source 56 is permitted to pass through solenoid valve 54 upon energization thereof in the manner to be described, the air will continue through conduit 58, therefrom into stationary portion 60 of conventional-type rotary union 62, and thence from the rotary portion 64 thereof into conduit 66 which communicates with the rear end 68 of said air cylinder 34. By dint of the force of the air against piston 52, the latter will be moved towards the forward end 70 of said air cylinder, whereby piston rod 36 will be extended to rotate pinion gear 48 and thus pivot cutting knife 16 into the operative cutting position.

As previously disclosed, flywheel 12 is advantageously controllably rotated within the range of 100–1000 rotations per minute, and the instant device is capable of controllably rapidly extending and retracting the cutting knife as the flywheel revolves. It has been determined, however, that where the flywheel is rotated at a rate exceeding 500 r.p.m., centrifugal force adversely affects the action of spring 53 thereby reducing the rapidity with which piston rod 36 is retracted upon cessation of air flow through conduit 66. To the end of obviating this shortcoming, an air cylinder capable of retracting as well as extending the piston rod through the action of air alone is herein utilized in the below described modified embodiment of the invention.

Figure 6:
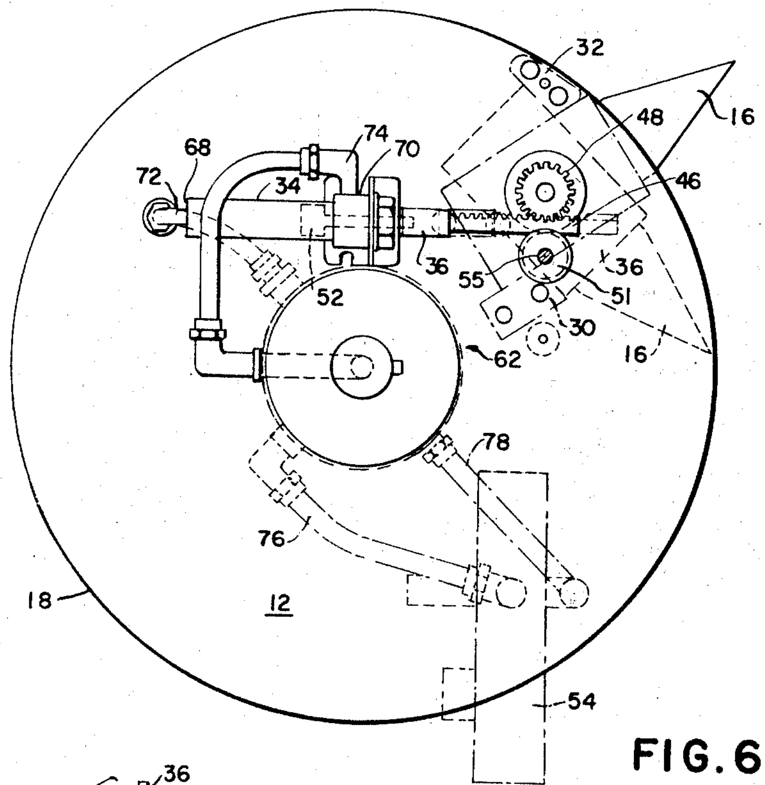
FIGURE 6 is an elevational view of a modified embodiment of the invention wherein double air actuated pneumatic means is utilized.
Figure 7:
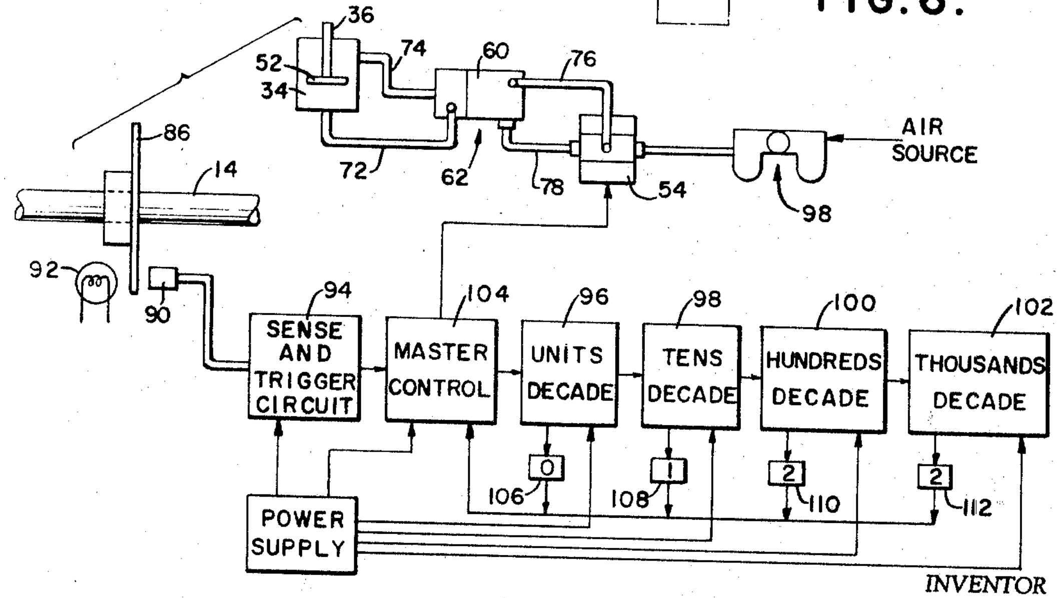
FIGURE 7 is a schematic illustration of the pneumatic means and the control system associated with the modified embodiment.

The utilization of the foregoing double air-actuated cylinder is illustrated in FIGURES 6 and 7 of the drawings wherein like numerals are used to designate parts similar to those used in the spring retracting embodiment heretofore described in conjunction with FIGURES 2–5. It will be seen that in this embodiment, air cylinder 34 is provided with air conduits 72 and 74 fitted to rear end 68 and forward end 70, respectively, thereof. Said air conduits 72 and 74 are each connected to the rotary portion 64 of rotary union 62. Conduits 76 and 78 carry air from solenoid valve 54 to the stationary portion 60 of said rotary union. Conduits 76 and 78 are communicably associated with conduits 72 and 74, respectively, whereby when the solenoid valve is de-energized air will flow through conduit 78 to the rotary union and therefrom through conduit 74 and into the forward end 70 of air cylinder 34. Thus, air pressure acting on piston 52 at the forward end 70 of said cylinder, biases said piston toward the rear end 68 of said cylinder and maintains cutting knife 16 in the normally retracted inoperative position represented in broken line configuration in FIGURE 6. Conversely, when solenoid valve 54 is energized, air will flow through conduit 76 to conduit 72 through said rotary union and the flow of air through conduits 78 and 74 will be curtailed. Accordingly, air flow through conduit 72 into the rear end 68 of the air cylinder serves to move piston 52 forward whereby piston rod 36 is extended and whereby gear rack 46, by meshing with pinion gear 48 as aforedescribed, will rotate cutting knife 16 into the extended operative position as shown. It will be appreciated, therefore, that inasmuch as air rather than spring means is utilized in the embodiment according to FIGURES 6 and 7 to retract cutting knife 16, an increasing centrifugal force acting against retraction of said cutting knife can be overcome by simply increasing the air pressure at forward end 70, thereby affording a positive and rapid retraction at flywheel rotational rates above 500 r.p.m.

In controlling the frequency of actuation of air cylinder 34, which is responsive to the energization and de-energization of solenoid valve 54, and hence, the flow of air therethrough, the cycle rate of flywheel 12 is herein utilized.

As will be observed in FIGURES 2 and 7 of the drawings, collar 86 is fixedly and coaxially secured about drive shaft 14 and is disposed spacedly with respect to primary movable member 12, said collar having an aperture 88 provided therethrough. As shown, photoelectric cell 90 is positioned on one side of said collar and light-emitting source 92 is positioned on the other side thereof, electronic sense and trigger circuit 94 being in circuit with said photoelectric cell 90. Light energy passing through aperture 88 upon each revolution of collar 86 is directed upon photoelectric cell 90. In accordance with well-known principles, light reduces the electrical resistance of photoelectric materials, e.g., selenium, and thereby allows the passage of electrical energy therethrough.

The circuit as shown in FIGURE 7 comprises four decade preset counters 96, 98, 100 and 102, said counters being driven by a Schmitt trigger included in aforesaid trigger circuit 94. The trigger circuit eliminates the effect of "dark" and "light" resistances of the photocell. In operation, when the photocell resistance drops below a preset level, the trigger circuit puts out a constant amplitude signal. When the photocell resistance increases above another point, the trigger output is zero. The trigger signal is then standardized and then fed to the input of the decade counter. The output of each decade is decoded by switches and steering diodes and when the proper preset count is reached, a control flip-flop in the master control 104 is actuated which in turn drives a transistor switch also included in the master control, into saturation and permits current to flow through the solenoid valve 106. At such time, therefore, that the transistor switch becomes saturated, the solenoid valve becomes energized to permit the pressurized air source, e.g., 80 lbs./in.$^2$ to flow from regulator 98, through the solenoid valve and to the rear end 68 of air cylinder 34 to move piston rod 36 forward and cutting knife 16 into the operative position. The solenoid remains energized until the end of the trigger pulse at which time the control flip-flop is reset and the transistors is biased to cut-off. Also, as the solenoid is energized a reset pulse is applied to return the counters to zero.

Elements 106, 108, 110 and 112 collectively, illustrate an exemplary preset revolutions program of 122 revolutions, although the configuration employed can count from 1 to 9,999 flywheel revolutions. However, it will be understood that the number of flywheel revolutions per cut is limited only by the number of decades incorporated into the control.

It will be appreciated that suitable light-interrupting means other than apertured collar 86 can be utilized. For example, a cam-type member which, because of an irregular cut-away peripheral region, will permit light from light source 92 to pass by the periphery only when the cut-away region is in alignment with said light source.

It will be further appreciated that other cycling types of primary movable members such as oscillating and reciprocating members are within the contemplation of this invention. It will be further understood that a plurality of cutting knives may be adapted to a single primary movable member and that tools other than cutting knives may be utilized whereby the machine would be capable of performing other operations in addition to cutting lengths of materials.

Accordingly and pursuant to the foregoing, within the purview of this invention various changes may be made in the forms, details, proportion and arrangement of parts, the combination thereof and mode of operation, which generally stated consists in a device capable of carrying out the objects set forth, as disclosed and defined in the appended claims.

What is claimed is:

1. A cutting machine for cutting predetermined lengths of tubing comprising a flywheel, a cutting knife pivotally mounted upon said flywheel whereby said knife can be angularly moved between a position extended beyond the periphery of said flywheel and a position wherein said knife lies substantially within said periphery, and drive means connected to said cutting knife for rotation with said flywheel whereby actuation of said drive means will occasion said angular pivotal movement of said cutting knife, said drive means comprising a pneumatic air cylinder having an extensible piston rod associated therewith, said piston rod being movable between extended and retracted positions, said piston rod having a free end and a gear rack provided at said free end, said gear rack being in meshing engagement with a pinion gear, the latter being attached to said cutting knife and a source of air pressure connected with said air cylinder.

2. A cutting machine as set forth in claim 1 wherein the center of rotation of said pinion gear is coaxial with respect to the pivotal axis of said cutting knife, and including a shaft connecting said pinion gear and cutting knife for united movement.

3. A cutting machine as set forth in claim 1 wherein said gear rack and pinion gear are located on one side of said flywheel and said cutting knife on the other side of said flywheel.

4. A cutting machine as set forth in claim 3 including a retaining wheel rotatably connected to said flywheel, said retaining wheel being disposed spacedly with respect to said pinion gear whereby said gear rack is movably received and retained between said pinion gear and said retaining wheel.

5. A cutting machine as set forth in claim 1 wherein said pneumatic air cylinder is partially recessed within a surface of said flywheel.

6. A cutting machine as set forth in claim 1 wherein said cutting knife extends beyond the periphery of said flywheel when said piston rod is in the extended position and lies substantially within said periphery when said flywheel is in the retracted position.

7. In a variable cutting device for cutting lengths of material fed past said device, a primary movable member movable in continuous cycles, a cutting knife, means to pivotally secure the knife to the primary member for movement in unison therewith and for movement between operative and inoperative positions, pneumatic means, a source of air pressure connected with said pneumatic means, said latter means upon introduction of air pressure thereto, being adapted to cause movement of said cutting knife into operative position for cutting said material, wherein said primary movable member comprises a rotating flywheel having an outer peripheral edge and wherein said cutting knife, when in the operative position, is disposed radially of said flywheel and extends beyond the peripheral edge thereof and said pneumatic means is mounted on and rotates with said flywheel.

8. In a variable cutting device as set forth in claim 7 wherein said cutting knife, when in the inoperative position, is disposed approximately 90° with respect to its operative position.

9. In a variable cutting device as set forth in claim 8 including stop means capable of restricting said cutting knife within limits of approximately 90° of angular movement.

10. In a variable cutting device as set forth in claim 7 including means to regulate the frequency of actuation of said air-actuatable means with respect to the cycle rate of the primary member.

11. In a variable cutting device as set forth in claim 7 including spring means, said spring means being adapted to return and retain said cutting knife in the inoperative position when the introduction of air pressure to said pneumatic means is curtailed.

12. In a variable cutting device as set forth in claim 7 wherein said pneumatic means comprises an air cylinder having forward and rearward ends, a piston slidably received within said cylinder and air inlet ports through said forward and rearward portions, whereby the introduction of air pressure to said inlet ports at said forward and said rearward portions causes said cutting knife to move to said inoperative and operative positions, respectively.

13. In a variable cutting device as set forth in claim 10 including a drive shaft axially connected to said primary member, said drive shaft having a collar fixedly secured thereabout, and disposed spacedly with respect to said primary member, said collar having an aperture provided therethrough, photoelectric means on one side of said collar and light-emitting means on the other side thereof, electronic switching means in circuit with said photoelectric means, said switching means being connected to solenoid valve means, and a pressurized air source connected to said solenoid valve means, the latter being adapted upon being energized, to permit air flow to said air-actuatable means, energization of said solenoid valve means being responsive to electrical impulses fed to said switching means in response to light energy received by said photoelectric means, the light energy directed upon said photoelectric means being regulated by the cycle rate of said primary movable member which determines the rate at which light energy will pass through said aperture.

14. In a variable cutting device as set forth in claim 13 wherein said electronic switching means includes a transistor as the switching element.

References Cited

UNITED STATES PATENTS

| | | | |
|---|---|---|---|
| 2,550,146 | 4/1951 | Gillich et al. | 83—354 |
| 3,091,988 | 6/1963 | Bonds | 83—354 X |
| 3,151,514 | 10/1964 | Noveske | 83—356 X |
| 3,319,500 | 5/1967 | Wild et al. | 83—556 X |

WILLIAM S. LAWSON, *Primary Examiner.*

U.S. Cl. X.R.

83—356, 556, 564